D. H. HOWELL.
Hand-Seeder.
No. 52,171.  Patented Jan. 23, 1866.
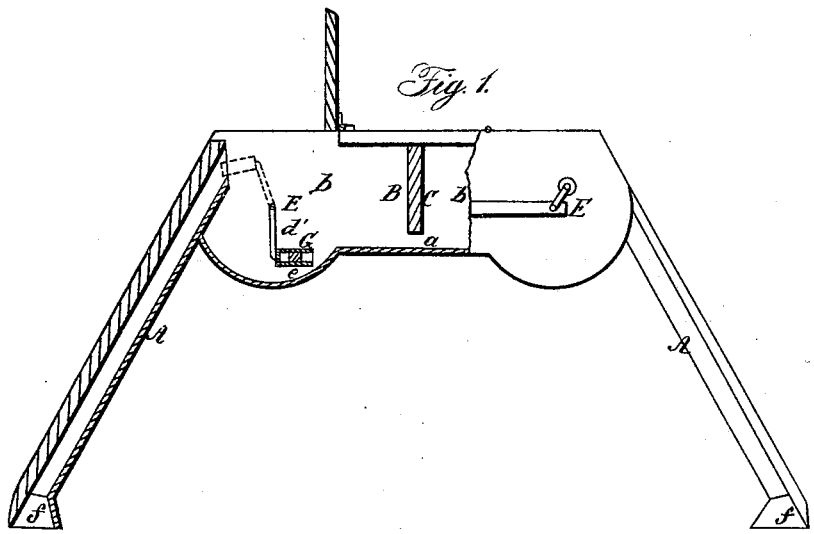
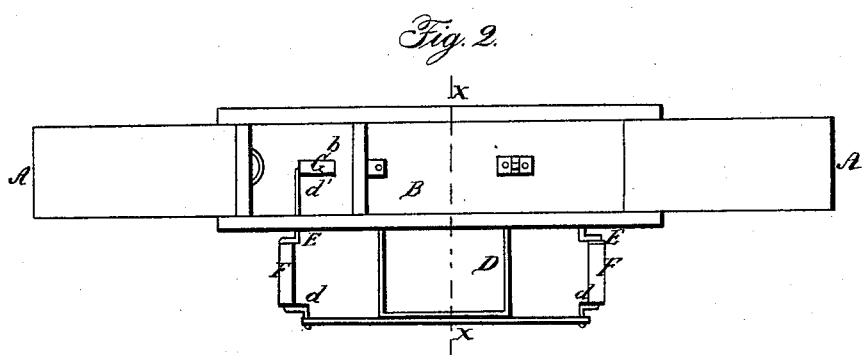
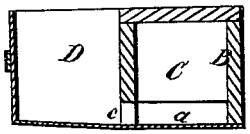
Witnesses:
Wm Trewrn
Wm E. Lyon
Inventor:
D. H. Howell
By Munn & Co.
Attorneys.

UNITED STATES PATENT OFFICE.

D. H. HOWELL, OF INDEPENDENCE, IOWA.

IMPROVEMENT IN HAND CORN-PLANTERS.

Specification forming part of Letters Patent No. 52,171, dated January 23, 1866.

*To all whom it may concern:*

Be it known that I, D. H. HOWELL, of Independence, in the county of Buchanan and State of Iowa, have invented a new and Improved Corn-Dropper; and I do hereby declare that the following is a full, clear, and exact description thereof, which will enable others skilled it the art to make and use the same, reference being had to the accompanying drawings, forming part of this specification, in which—

Figure 1 is a side sectional view of my invention; Fig. 2, a plan or top view of the same; and Fig. 3, a transverse vertical section of the same, taken in the line $x$ $x$, Fig. 2.

Similar letters of reference indicate corresponding parts.

This invention relates to a new and improved hand corn-dropper; and it consists in the employment or use of the seed-conveying tubes arranged with seed-boxes and a seed-distributing device, and all constructed in such a manner that the device may be manipulated with the greatest facility and the rows of corn planted simultaneously.

A A represent two seed-conveying tubes, the upper ends of which are attached to and communicate with a box, B, which has a central pendent partition, C, extending nearly down to its bottom, a space, $a$, being allowed underneath to admit of a communication between the two parts $b$ $b$. (See Fig. 1.) The bottoms of the parts $b$, where they join the tubes A, are of concave form, and to the side of the box B there is attached a hopper or box, D, which has an opening, $c$, at its lower part, in line with the partition C. The corn is placed in the box D, and passes therefrom into the two compartments or parts $b$ $b$ of the box B through the opening $c$.

E E are two shafts, which are each provided with two cranks, $d$ $d'$, having reverse positions. The cranks $d$ of these shafts are at the outer side of the box B, and are provided with handles F, while the cranks $d'$ are within the compartments $b$ $b$ of the box B, and are provided with seed-cups G, each of which has a sliding partition, $e$, by which the capacity of the cups may be regulated, as desired. (See Fig. 1.) These seed-cups G are moved in the arcs of circles and in line with the upper ends of the tubes A A, and they are thus moved by the operator working the handles F, or rather the shafts E E, the cranks $d$ $d$ of which cause the cups to be moved down when the handles are raised, and moved up when the handles are moved down.

The operation is as follows: The box D being supplied with corn, which passes therefrom into the compartments $b$ $b$ of the box B, the operator takes hold of the handles F F and raises the device, the cups G G being thereby moved down into the corn, where they become filled. The device is then lowered until the lower ends of the tubes A A come in contact with the ground, the handles F being pressed down and causing the filled buckets to rise and deposit their contents into the upper ends of the tubes A A, which convey it to the earth.

The lower ends of the tubes A A are made of flaring form, as shown at $f$, to admit of the corn scattering as it strikes the earth.

When the device is again raised the cups G are turned down and become filled, and turned up again, and their contents discharged into the tubes A, when the device is placed upon the earth for the succeeding dropping.

This device may be manipulated with the greatest facility, and, as two rows are planted simultaneously, the work is expeditiously performed.

Having thus described my invention, I claim as new and desire to secure by Letters Patent—

The reverse cranks $d$ $d$ on the shafts E E, provided, respectively, with the cups G and handles F, and arranged substantially as shown, with the box B, having the seed-conveying tubes A A attached, to operate in the manner as and for the purpose set forth.

D. H. HOWELL.

Witnesses:
J. S. WOODWARD,
WM. H. JOSLIN.